UNITED STATES PATENT OFFICE.

ADOLPH WOOLNER, JR., AND ALADÁR LÁSSLOFFY, OF PEORIA, ILLINOIS, ASSIGNORS TO WOOLNER DISTILLING COMPANY, OF PEORIA, ILLINOIS, A CORPORATION OF ILLINOIS.

PROCESS FOR MAKING ALCOHOL.

No. 923,232.       Specification of Letters Patent.       Patented June 1, 1909.

Application filed June 28, 1907. Serial No. 381,219.

*To all whom it may concern:*

Be it known that we, ADOLPH WOOLNER, Jr., and ALADÁR LÁSSLOFFY, citizens of the United States and Hungary, respectively, residing at Peoria, in the county of Peoria and State of Illinois, have invented certain new and useful Improvements in Processes for Making Alcohol; and we do hereby declare that the following is a full, clear, and exact description of the invention, which will enable others skilled in the art to which it appertains to make and use the same.

This invention relates to a process for the manufacture of alcohol.

An object of the invention is to provide a process by which a greater amount of alcohol can be produced from a given quantity of material than has heretofore been possible.

A further object is to provide a new process in the manufacture of alcohol, whereby its cost of production is cheapened.

A further object is to provide a process for the manufacture of alcohol wherein a much smaller amount of malt is necessary for a given yield than has heretofore been possible.

Another object is to provide a process of making alcohol by treating distillery slop or extracts of grains by growing in them fungi which secrete diastase and afterward adding this treated material to the usual mash in the fermenting tub.

Another object lies in utilizing both a malt diastase and a fungi diastase during fermentation to thus combine the advantages of each for the manufacture of alcohol to avoid the disadvantages which they have when separately used.

Other objects in our process will appear in the following description.

The method commonly used for the manufacture of alcohol out of the starches of the raw material consists in first cooking the said raw material in order to liquefy the starch and afterward converting the liquefied starch by the addition of malt at a temperature of about 145° Fahrenheit; the mash thus obtained being afterward cooled and yeast added to it in order to bring it into fermentation.

To those skilled in the art it is known that by the process termed "conversion" the transformation of the liquefied starch is never a complete one, only about 80 per cent. fermentable sugar being obtained from the starch, the remaining 20 per cent. being dextrins which are directly infermentable but which are transformed during the fermentation into sugar and subsequently by the yeast into alcohol if sufficient diastase is present in the mash during the fermenting period. It is also known that for this conversion it is usually necessary to use from 10 to 12 per cent. of raw material in the shape of malt but we have found that in the conversion of the mash the percentages of sugar and dextrins above named can be obtained with a much smaller amount of malt than heretofore used, we having found that as low as three per cent. of malt will accomplish the same conversion in producing a yield of the aforesaid 80 per cent. maltose and 20 per cent. dextrins. The reason that the distiller, under the common methods must use so large an amount of malt is that he must have a sufficient quantity of diastase in order to transform the dextrins and starches left from the conversion into fermentable sugar during fermentation, since if the quantity of malt is too small the diastase which the mash contains would not be sufficient for the work during the fermenting period since the diastase continually decreases.

Our invention consists in using, for the conversion, an amount of malt necessary only for a complete saccharification of the starches, that is, a saccharification in which the maximum proportion of maltose is obtainable under normal condition, and then to introduce into the converted mash, which is already cooled to the usual fermenting temperature, the rest of the necessary diastase by the addition of fungi diastase which we obtain by the growth of diastase producing fungi in a suitable medium, such as distillery slop or extract of grain, the fungi employed being preferably *Aspergillus oryzæ*, or through yeast capable of diastatic secretion like *Schizosaccharomyces pombe* or *Schizosaccharomyces octosporus*, has acquired diastatic power.

We employ the malt diastase for the conversion and through the addition of diastatic slop we add fungi diastase thereby using both the malt and the fungi diastase in the course of the fermentation, whereas in other processes but one diastase is present during fermentation, that is, either the malt-diastase or the fungi diastase but not both. The malt diastase and the fungi diastase having different properties act differently.

We have found that fungi diastase, while having very good saccharifying properties at the fermenting temperature, has a weak liquefying action on starch and will, therefore, give a very poor conversion consequently we use malt diastase as in the older methods for our conversion. Again, at the fermenting temperature malt diastase acts more quickly than the fungi diastase, while the latter works slower but more thoroughly and we have discovered that a combination of both gives a far superior result with regard to accomplishing the transformation of the material into sugar and subsequently into alcohol than when either is used separately. Therefore, a mash containing malt diastase and fungi-diastase combines the speed of fermentation of malt mashes with the more thorough action of the fungi diastase and this process has in its favor, therefore, not only a considerable economy in the cost of raw material, malt being much more expensive than the unmalted grain, but has also the advantage of a higher alcoholic yield.

Distillers have used, for many years, slop from a previous fermentation in addition to the mash in the fermenter and the use of slop in this manner is a special characteristic of the American method of manufacturing alcohol. The amount of slop thus added is from ⅓ to ½ of the quantity of the mash. The purpose of adding this large proportion of slop to the fermenting mash is first to utilize the antibacterial properties of the acid therein contained; and second to utilize the fermentable substances left in the slop from a previous fermentation.

Our invention as distinguished from the above includes a treatment of distillery slop or some other similar extract of grains having the same properties, (as, for instance, a liquid mixture containing a high percentage of nitrogenous substances, a small amount of carbon hydrate, and a high degree of acidity) before it is added to the fermenting mash for the production of diastase. This consists in growing in liquid slop, extract of grain, or similar liquid medium, certain fungi which secrete diastase as already stated. By this means we introduce into the mash through the slop a considerable quantity of fungi diastase as a substitute for the large quantity of malt required by the ordinary processes. Our method of producing fungi diastase is much cheaper than the production of malt diastase.

In growing the diastase producing fungi we have found, that it is strictly necessary to avoid all contaminations by acid producing bacteria, which later introduced into the mash would injure the fermentation and, as is known to those skilled in the art, would, as a consequence, cause a great loss of alcohol. The growing of fungi on solid or pasty substances, as has been done before us, has been necessarily unsuccessful by reason of having been carried on in the open air. But even applying the methods of pure culture, that is, growing the fungi in sterilized air tight vessels, and using liquid nutritious media, it will very often happen that the pure culture will become contaminated, the diastase producing fungi having no power to overcome the acid bacteria.

We have found that the proper way to grow diastase producing fungi is to use both the principles of artificial pure culture, (Hansen), that is, to grow them in a sterilized liquid in air tight vessels, and the principles of natural pure culture (Delbruch) by the use of a liquid substance of relatively high organic acidity, which acidity will give the diastatic fungi an advantage over the acid bacteria, the high degree of acidity preventing the propagation of contaminating organisms. The liquid distillery slop, which we preferably use for the carrying out of our process, is an ideal substance for this purpose. The slop is genetically sterile leaving the still at boiling temperature, and it is an excellent nutritious medium for the diastatic fungi since it contains many soluble nitrogenous substances, having at the same time a remarkable immunity from contamination of acid producing bacteria, owing to its own relatively high acidity.

We do not confine ourselves to growing the fungi in distiller's slop necessarily, since any other liquid nitrogenous substances, such as extracts of various grains or like mediums, brought to the same organic acidity as distiller's slop and which will furnish the proper nourishment for the fungi, may be used.

Just here we desire to state that when we refer to the slop that is added to the usual mash under our process, we mean "diastatic slop", that is, a slop or extract of grain or any other suitable liquid material in which fungi with diastatic properties have been grown.

The following is the preferred manner of carrying out our process. The slop as it leaves the beer still at the boiling temperature, and therefore sterile, as already stated, is filled into closed tanks or pure culture apparatus after eliminating the solids, which, however, is not a necessity but a preference. By the use of a small amount of steam the slop is held at the boiling point in order to keep it sterile while the said tanks are being filled, so that it cannot become contaminated with bacteria, after which filtered air is blown into and through the slop and the latter is cooled with water until its temperature is brought down to about 90° Fahrenheit. One half of a pint of a pure culture of the fungi of which we prefer to use *Aspergillus oryzæ*, is now sown into the slop. Regardless of the size of the tank employed one-half of a pint of a pure culture is enough as seed, since the fungi grows in the slop with extreme rapidity. The pure culture which we use for seed is obtained in the proper bacteriological way, well known to all fermentologists.

Under continual aeration the slop remains in the pure culture tank at the initial temperature and after 36 hours from the time of sowing the fungi is developed and the slop is ready to be added to the mash in the fermenter. The mash for the fermenter is prepared in the usual manner with the only difference that but three to five per cent. of the grain is used in the shape of malt for the conversion the percentage of such malt varying with its diastatic power; having regard also, to the quantity of diastatic slop which is to be placed in the fermenter to make up the desired quantity of beer. We take, for instance, for every 100 bushels of corn (5600 pounds) 230 pounds of barley-malt for the conversion. The corn is first cooked with the usual quantity of water, say 1500 gallons, under pressure, to a temperature of about 300° Fahrenheit, then cooled to the converting temperature of 145° Fahrenheit and finally converted with the malt which has been ground with water to a milky consistence. After 30 minutes from the time of the mixing with the malt the mash is converted.

After the conversion with malt has taken place, which can easily be determined by the well known iodin test, the mash or wort is cooled to the usual fermenting temperature and placed in the open fermenting tub where it is mixed with the usual yeast-mash at once. The making of distiller's yeast mash is well known and needs no explanation to those skilled in the art. We prefer, however, to employ a pure culture yeast by making a yeast mash of substantially two to five per cent. of the contents of the fermenting tub (by volume) being governed by conditions existing for a given distillery, i. e., as to the quantity of beer to be produced.

Our ability to bring the mash without delay into alcoholic fermentation guarantees the highest possible safety for the results. When the mash is in the fermenter we add the diastatic slop to it and the amount added depends upon the amount of beer to be made of a bushel of grain. For instance, if 1000 bushels of grain are to be mashed for a fermenter of 30,000 gallons capacity, 22,000 gallons of mash will be prepared from the 1,000 bushels and 8,000 gallons of the diastatic slop will be added to it but the greater the amount of such diastatic slop that can be used the less malt-diastase will be required. The fermentation goes on in the same way as with the ordinary malt mashes and in 60 hours from the time of beginning to fill the tub the mash is completely fermented and ready for distillation.

We do not confine ourselves to putting the diastatic slop or other diastatically prepared medium immediately into the mash after the addition of the yeast but may reserve this for many hours afterward. Thus we have considerable latitude in the use of our method.

We have found that by mixing the slop in which we cultivate the fungi, with a small amount of starch the diastatic secretion is increased, this being done preferably in the pure culture apparatus, the proportion being about one-half pound of starch to ten gallons of slop, the starch being added in pure form, or, for instance, in the form of corn meal. We have further found that our process gives excellent results in the manufacture of compressed yeast after the so-called Viennese process in which slop is used in addition to the mash.

Having thus described our invention, what we claim as new and desire to secure by Letters Patent is—

1. A process in the manufacture of alcohol consisting in combining malt diastase and fungi diastase in prepared distillery products wherein both are present in an active form during fermentation.

2. A process in the manufacture of alcohol consisting in growing in distillery slop fungi having diastatic properties, combining the same with a malt converted mash and distilling the mixture after fermentation.

3. A process in the manufacture of alcohol consisting in combining malt-diastase and fungi-diastase in a previously prepared distillery product and distilling the same after fermentation substantially as set forth.

4. A process in the manufacture of alcohol consisting in preparing distillery slop by growing fungi of the *Aspergillus oryzæ* type therein, preparing a mash containing malt-diastase, combining the two, and finally distilling the mixture after fermentation.

5. A process in the manufacture of alcohol consisting in growing diastase secreting fungi in a fluid medium adapted for its reception and development, combining the thus prepared medium with a mash containing malt-diastase and distilling the mass after the same has been brought into fermentation.

6. A process in the manufacture of alcohol consisting in growing diastase secreting fungi in a sterilized nitrogenous fluid medium, combining the same with a malt converted fermenting distillery mash and distilling the product after fermentation.

7. The process of growing diastase secreting fungi in a sterilized liquid nitrogenous medium while held removed from contaminating influences, and afterward combining the same with a fermenting mash containing malt diastase and distilling the mixture after fermentation.

8. The process of growing diastase secreting fungi in a sterilized liquid nitrogenous medium while held removed from contaminating influences and afterward in open air combining the same with a fermenting mash containing malt-diastase and distilling the mixture after fermentation.

9. A process in the manufacture of alcohol consisting in adding to a nitrogenous medium, such as extract of cereals, diastase secreting fungi, adding it to a grain mash containing malt diastase, and distilling the mixture after fermentation.

10. A process in the manufacture of alcohol consisting in growing in liquid having the described characteristics of distillery slop, fungi having diastic properties, such as *Aspergillus oryzæ*, in pure culture, adding the same to a mash containing malt diastase and distilling the mass after fermentation.

11. A process in the manufacture of alcohol consisting in cooking raw materials containing starch converting the cooked mass with malt at the usual converting temperature, cooling the mixture to the usual fermenting temperature, mixing it with distiller's yeast and with a liquid in which diastase secreting fungi have been cultivated in pure culture and distilling after fermentation.

12. A process in the manufacture of alcohol consisting in treating a nitrogenous medium, preferably one of fluid nature by sowing diastase secreting fungi therein, allowing sufficient time for the development of such fungi throughout the bulk, combining the product with a suitable material containing malt diastase, combining therewith a fermenting agent allowing sufficient time for fermentation, and finally distilling the ferment.

13. A process in the manufacture of alcohol consisting in sowing in a previously sterilized nitrogenous medium fungi having diastatic properties, holding the medium sterile to hold it free from contaminating influences during the sowing and growth of the fungi, combining the same after full development of the fungi therein with a nutritious medium containing malt-diastase, adding a fermenting agent and finally distilling after fermentation.

14. A process in the manufacture of alcohol consisting in growing in a nitrogenous medium in pure culture, fungi having diastatic properties, allowing the fungi to fully develop throughout the medium, combining the prepared medium with a second medium containing malt-diastase and adding a fermenting agent.

15. A process in the manufacture of alcohol consisting in adding to a mash at the usual converting temperature, an amount of malt necessary only for the usually complete saccharification of the starches in said mash, and then adding thereto diastase in the form of fungi-diastase in an amount sufficient to fully convert the mash during fermentation.

16. A process in the manufacture of alcohol consisting in adding to a mash at the usual converting temperature, an amount of malt necessary only for the complete saccharification of the starches in said mash, and then adding thereto diastase in the form of fungi-diastase in an amount sufficient to fully convert the mash during fermentation, allowing the mixture to ferment and finally distilling the same.

17. A process in the manufacture of alcohol consisting in heating to a high degree an acidified liquid nitrogenous medium while protected from the air to render it immune from contaminating influences, cooling the liquid to substantially 90° Fahrenheit, sowing therein fungi-diastase while still protected from the air, combining the treated medium with a mash containing malt diastase and finally adding a yeast thereto to bring the mixture into fermentation.

18. A process in the manufacture of alcohol consisting in heating to the boiling point an acidified liquid nitrogenous medium in a pure culture to render it sterile, reducing the temperature to substantially 90° Fahrenheit, sowing therein fungi diastase and a small quantity of starch while still in pure culture and after allowing the mixture to mature combining it with a mash containing malt diastase, and then adding to the combined mass, a yeast mash to bring the whole into fermentation.

19. In the manufacture of alcohol, the process consisting in preparing a distillery product containing both malt diastase and fungi diastase, allowing said product to ferment, and distilling the same after fermentation.

20. In the manufacture of alcohol, the process which consists in preparing a distillery product, malt diastase, and fungi diastase, and subjecting said product to the action of the other materials in succession.

21. In the manufacture of alcohol, the process which consists in subjecting a suitable distillery product to the action of malt diastase to secure such conversion as may be had thereby, and subjecting the resultant product to the action of fungi diastase, to secure further conversion.

In testimony whereof we affix our signatures, in presence of two witnesses.

ADOLPH WOOLNER, JR.
ALADÁR LÁSSLOFFY

Witnesses:
R. C. RYAN,
E. W. STURM.